United States Patent [19]

Carolla et al.

[11] Patent Number: 4,722,378
[45] Date of Patent: Feb. 2, 1988

[54] TIRE TREADS WITH CONVEX ELEMENTS

[75] Inventors: Russell A. Carolla; Thomas H. Wells, both of Akron; Peter R. Shepler, Cuyahoga Falls, all of Ohio

[73] Assignee: The Goodyear Tire & Rubber Company, Akron, Ohio

[21] Appl. No.: 864,396

[22] Filed: May 19, 1986

[51] Int. Cl.⁴ .............................................. B60C 11/04
[52] U.S. Cl. .................................................. 152/209 R
[58] Field of Search ................ 152/209 R, 209 A, 456

[56] References Cited

U.S. PATENT DOCUMENTS

| | | | |
|---|---|---|---|
| 925,937 | 6/1909 | Motz | 152/324 |
| 1,057,164 | 3/1913 | Messenger | 152/209 R |
| 1,092,353 | 4/1914 | Hallanan | 152/196 |
| 1,505,233 | 8/1924 | Wolfe | 152/209 R |
| 3,177,917 | 10/1963 | Walters et al. | 152/209 R |
| 3,410,329 | 11/1968 | Bezbatchenko, Jr. | 152/209 R |
| 3,805,865 | 4/1974 | Price | 152/209 R |

FOREIGN PATENT DOCUMENTS 2343747  3/1975  Fed. Rep. of Germany .
1196438  6/1967  France .
2312385 12/1976  France .
2317112  2/1977  France .

OTHER PUBLICATIONS

Testing and Analysis of Tire Hydroplaning, Robert W. Yeager and Jack L. Tuttle, published by Society of Automotive Engineers, 1972.

*Primary Examiner*—Michael Ball
*Attorney, Agent, or Firm*—L. R. Drayer

[57] ABSTRACT

The tread (28) of a tire (10) has a plurality of traction elements (34), each of which has a ground-engaging surface. The ground-engaging surfaces are convex in either an axial direction, a circumferential direction, or both directions. The convex paths followed by the ground-engaging surfaces vary between ground-engaging surfaces across the axial width of the tread in relationship to the unit tread pressure of the tire, and may also vary between ground-engaging surfaces that are axially aligned but located at different places around the circumference of the tire.

10 Claims, 11 Drawing Figures

TIRE TREADS WITH CONVEX ELEMENTS

The present invention relates generally to tire treads, and more specifically to the shape of the ground-engaging surfaces of the traction elements which are a part of a tire tread.

It is well known in the tire art that the contact pressure between the tread of a tire and a roadway is not uniform across the footprint of a tire in a lateral direction, nor is the contact pressure uniform for a given point on a ground-contacting surface of a tire tread as that point passes through the footprint of a rotating tire. The non-uniformity of contact pressure, sometimes referred to in the tire art as unit tread pressure, affects the shape of the footprint and the operating characteristics of a tire. The present invention provides a means of attaining desirable operating characteristics for a tire by contouring the ground-engaging surfaces of the tire in a particular manner.

The tread of a tire may have any number of traction elements which have ground-engaging surfaces. The ground-engaging surfaces of the traction elements of most tires conform substantially to the overall lateral and circumferential curvature of the tire. However; it is known from U.S. Pat. Nos. 1,092,353 and 1,505,233 that the ground-engaging surfaces of traction elements may follow a curved path which is convex as viewed in a radial cross-section of a tire, with the tread having an overall curvature that is not coincident with the ground-engaging surfaces of the traction elements. Furthermore; it is known from U.S. Pat. No. 1,505,233 and French Pat. No. 2,312,385 that the ground-engaging surfaces of traction elements may follow a curved path which is convex as viewed in a cross-section of the tire taken perpendicular to the axis of rotation of the tire, with the curved path not being coincident with any circle that has its center located on the axis of rotation of the tire. The prior art still leaves unsolved the problem of providing more uniform unit tread pressures because the curved paths followed by the ground-engaging surfaces of the traction elements taught therein are the same for each traction element of the tread.

There is provided in accordance with one aspect of the present invention a tire comprising a tread having a base portion and a plurality of traction elements extending radially outwardly from said base portion, said traction elements each having a ground-engaging surface which communicates with said base portion by means of a plurality of walls, a plurality of said ground-engaging surfaces having a form such that the locus of the points on any of these plurality of ground-engaging surfaces traveling laterally across them at any location along their circumferential lengths defines a line which is continuously convex and has its center of curvature disposed radially inwardly of said convex line, the amplitudes of the convex lines defined by the locus of the points on said plurality of the ground-engaging surfaces varies across the axial width of the tread with respect to the variation in unit tread pressure across the axial width of a footprint of the tire when the tire is mounted on a rim having the design rim width for said tire, and subjected to a load while the tire is inflated to its specified inflation pressure for said load, such that the amplitude of a convex line is greater for a ground-engaging surface located in a region of relatively high unit pressure and lesser for a ground-engaging surface located in a region of relatively low unit pressure.

There is provided in accordance with another aspect of the invention a tire comprising a tread having a base portion and a plurality of traction elements extending radially outwardly from said base portion, said traction elements each having a ground-engaging surface which communicates with said base portion by means of a plurality of walls, a plurality of said ground-engaging surfaces having a form such that the locus of the points on these ground-engaging surfaces traveling in a circumferential direction at any location across the axial width of these ground-engaging surfaces defines a line which is continuously convex and has its center of curvature disposed radially inwardly of said convex line, said convex line not being coincident with any circle that has its center located on the axis of rotation of the tire, and the greatest amplitude of said convex line being located at a point other than the mid-point of the circumferential length of said ground-engaging surface.

Various advantages and features of the invention will be apparent in the following description and claims, considered together with the drawings forming an integral part of the specification and in which:

Figure 1:
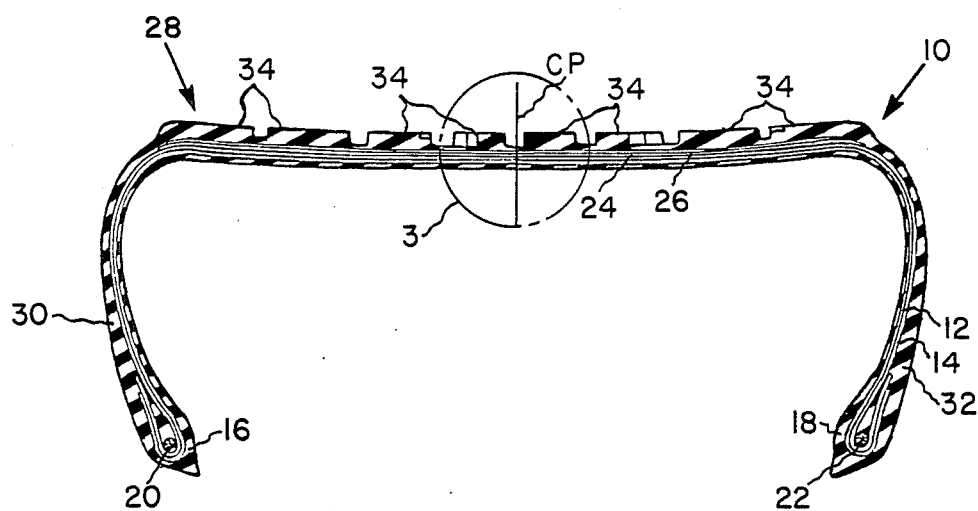
FIG. 1 is a radial cross-sectional view of a prior art tire.

Referring first to FIG. 1, there is illustrated a radial cross-sectional view of a prior art tire. The tire 10 is a pneumatic tire having at least one carcass reinforcing ply 12,14 which extends between the bead portions 16, 18 of the tire. Each of the bead portions contains a substantially inextensible annular bead core 20,22 around which each carcass ply is anchored. In the practice of the present invention the carcass ply structure may be of the well known bias ply construction, although the well known radial ply construction is preferred. A tread-reinforcing member comprising at least one belt ply 24,26 is disposed radially outwardly of the carcass ply structure and radially inwardly of the tread portion 28 of the tire. As used herein "radial" and "radially" refer to directions perpendicular to the axis of rotation of a tire, and "axial" and "axially" refer to directions parallel to the axis of rotation of a tire.

Figure 2:
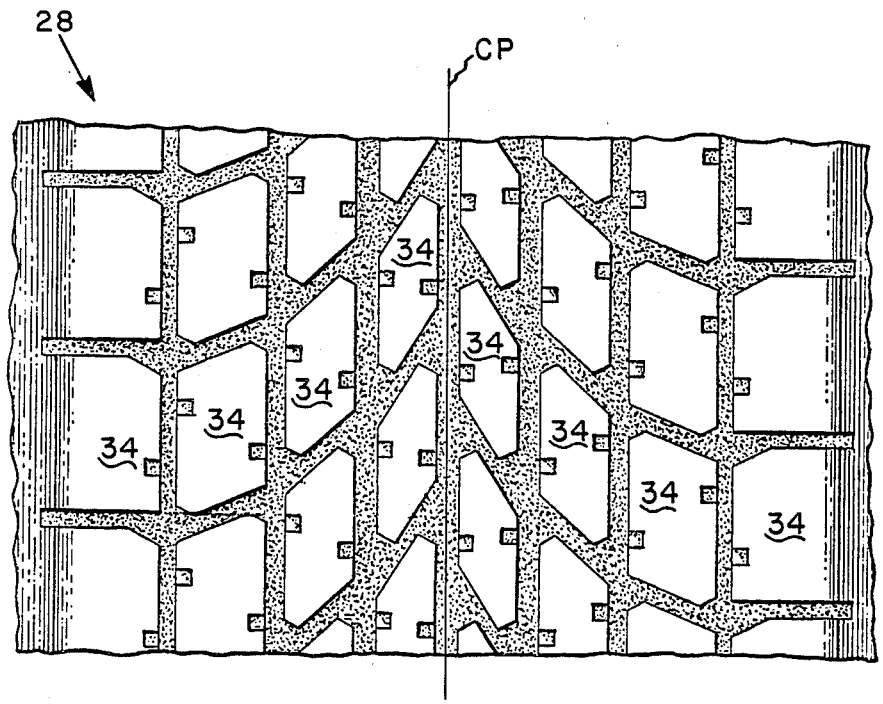
FIG. 2 is a fragmentary plan view of the tread portion of the tire illustrated in FIG. 1.

The tread portion 28 of the tire comprises an elastomeric substance such as natural or synthetic rubber, or a combination thereof. Sidewalls 30,32 extend generally radially inwardly from the tread portion to the bead portions 16,18. The tread portion, as seen also in plan view in FIG. 2, comprises a plurality of traction elements 34 disposed on each side of a mid-circumferential centerplane CP. As used herein, a "mid-circumferential centerplane" is a plane which is perpendicular to the axis of rotation of a tire, located midway between the lateral edges of the tread in a footprint of a tire that has been mounted on its specified rim, then inflated to its specified inflation pressure and subjected to its rated load. As used herein, "axially inwardly" is understood to mean an axial direction going from a lateral edge of the tread towards the mid-circumferential centerplane, and "axially outwardly" is understood to mean an axial direction going from the mid-circumferential centerplane towards a lateral edge of the tread. In a similar manner, as used herein, "radially inwardly" is understood to mean a radial direction going towards the axis of rotation of a tire, and "radially outwardly" is understood to mean a radial direction going away from the axis of rotation of a tire.

Figure 3:
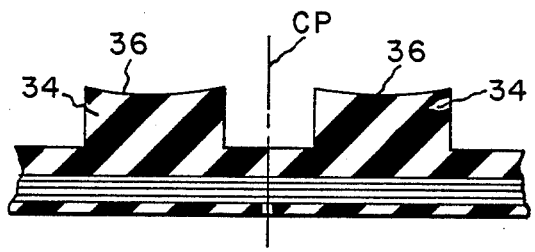
FIG. 3 is an enlarged view of the portion of FIG. 1 enclosed by the circle 3 in FIG. 1.

An undesirable characteristic of prior art tires, which is overcome by the present invention, can best be described by referring next to FIG. 3, which is an enlargement of a portion of FIG. 1, as contained in the circle 3 of FIG. 1. The ground-engaging surfaces 36 of the prior art traction elements 34 have a concave profile (which is greatly exaggerated in this illustration). While the concavity of the traction elements, which can occur in both radial ply and bias ply tires, may be very inconspicuous to a casual observer of a tire, this condition can in fact have an adverse effect upon the operating characteristics of the tire, in a manner that will soon be explained herein. This concave condition can be caused at least in part by shrinkage of the elastomeric substance comprising the traction elements after the tire is removed from the mold in which it is vulcanized. It is understood that while the traction elements enlarged in FIG. 3 are located near the mid-circumferential centerplane CP of the tire, this concave condition can occur in any, or all, of the traction elements of a tread regardless of their location. Furthermore, it is understood that this concavity phenomena can occur regardless of the general geometric shape of the traction elements.

Figure 4:
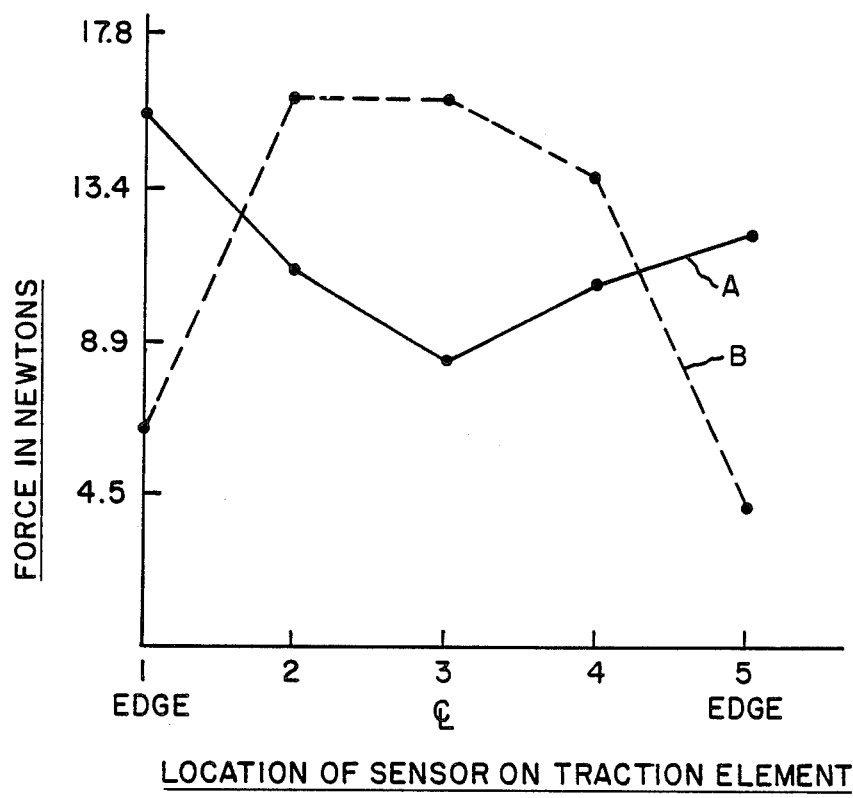
FIG. 4 is a graph showing the radial forces on traction elements of both prior art tires and tires according to the invention.

FIG. 4 is a graph illustrating the contact pressure across the ground-engaging surface of a single traction element of a tire manufactured according to the prior art and a tire according to the present invention. In both instances the traction element was a continuous rib located at the mid-circumferential centerplane of a tire. As used herein, and in the claims, a traction element is understood to mean both an individual button that is completely surrounded by a groove, or grooves, or a combination of grooves and a lateral edge of the tread, and a rib which extends circumferentially around a tire. A sensor which measures the radial force between a tire and a supporting surface was placed at various locations across the axial width of the corresponding traction element of both the prior art and the new tire. The tire were substantially identical in construction and tread design, with the exception of the contour of the ground engaging surfaces of the traction elements. These tires were mounted on the same size rims, and both were inflated to 100 kPa and subjected to a load of 363 kg. Solid line A on the graph represents the contact pressure across the width of the prior art traction element. It is clear that the contact pressure is lower at the center of the traction element than at the axial edges of the element. This same phenomena can be illustrated by referring to FIG. 5.

Figure 5:
FIGS. 5 and 6 are tire footprints.

FIG. 5 is the footprint of a prior art tire of size 280/50-13, mounted on its specified rim which is 28 cm wide, inflated to its specified inflation pressure of 124 kPa, and subjected to its specified load of 272 kg. It can be observed from the tire footprint in FIG. 5 that the edges of the traction elements are generally in solid contact with the supporting surface while the central portions of the ground-engaging surfaces of the traction elements are not flat against the supporting surfaces. The effect of the concavity of the ground-engaging surfaces of prior art traction elements is lower contact pressure at the center of traction elements, which reduces the water evacuating efficiency of the tires when they are operated on water covered surfaces. That is to say, instead of water being forced towards the axial edges of the traction element water can be trapped between a traction element and the roadway because the pressure is greater at the traction element's edges than at its center. When a vehicle is traveling on a water covered road this phenomena can result in the traction elements being lifted off of the roadway. This phenomena is known as aquaplaning.

Figure 7:
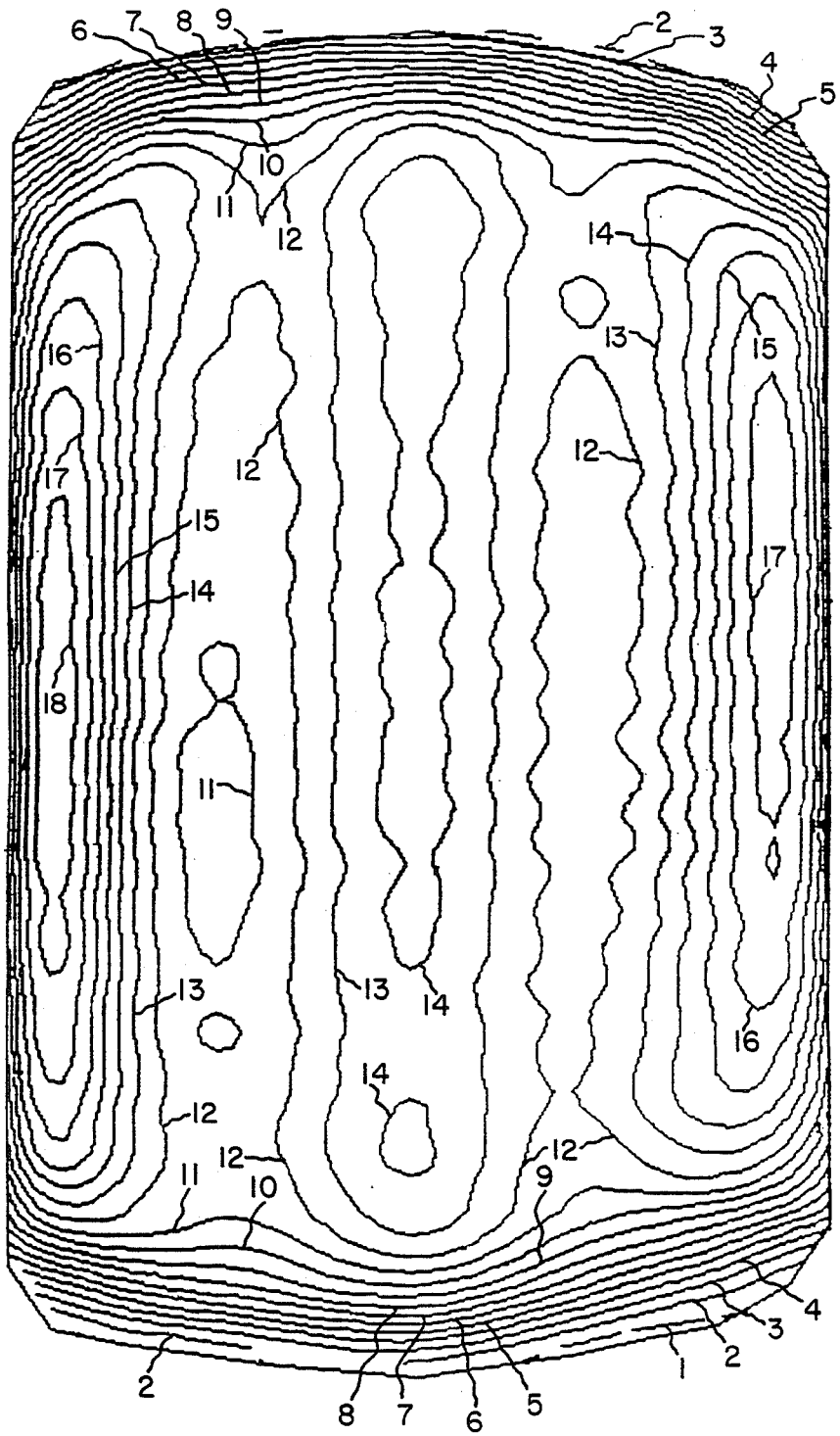
FIGS. 7 and 8 illustrate pressure distribution in a tire footprint.
Figure 8:
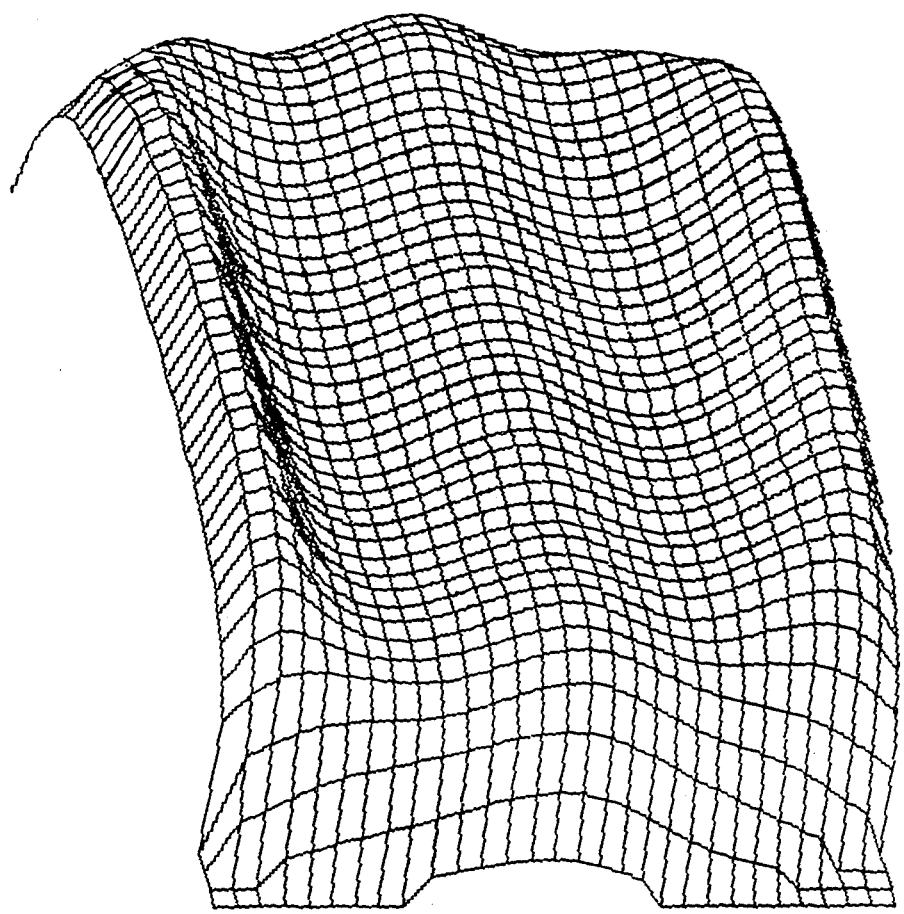

It is known in the tire art that unit tread pressure, that is to say the contact pressure between a tire and the ground, is not uniform across the axial width of a tire, nor is it uniform for a given point on a ground-engaging surface of a tire as that point passes through the footprint of a rotating tire. FIG. 7 is an illustration of the complex pressure distributions that are experienced by a pneumatic tire. These pressure distributions are affected by many factors such as load, inflation pressure, cornering, speed and water on the roadway. FIG. 7 shows the distribution of contact pressure in the ground contact patch of a radial tire. The lines indicated by numerals are isobars of force in Newtons. That is to say that the area disposed between a 12 Newton isobar and a 13 Newton isobar, multiplied times 12 will have a particular contact pressure, and so forth. This figure is indicative of the magnitude and distribution of the contact pressures as illustrated by forces in a tire footprint. FIG. 8 is a three-dimensional representation of the footprint and contact pressures of FIG. 7. While FIGS. 7 and 8 are intended to be merely a representative example of a pressure distribution in a tire footprint, they do illustrate the complex nature of such a pressure distribution. This pressure distribution data was generated by mounting a tire on a rim having the design rim width for said tire, subjecting the tire to a load while the tire is inflated to its specified inflation pressure for said load, and repeatedly rolling the tire over a pin (7.62 mm×7.62 mm square) and recording the force on the pin. Such a procedure has been described, for example, in *TESTING AND ANALYSIS OF TIRE HYDROPLANING*, by Robert W. Yeager and Jack L. Tuttle, published in 1972 by the Society of Automotive Engineers, Inc. as technical paper No. 720471.

Figure 9:
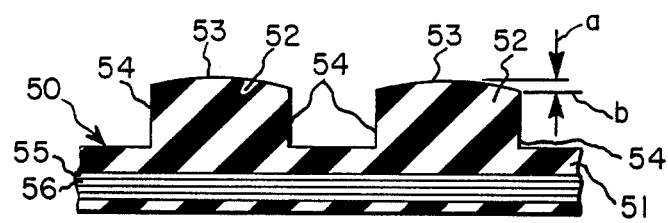
FIG. 9 is a partial cross-sectional view taken in a plane that contains the axis of rotation of the tire of a tire according to the invention.

FIG. 9 is an enlarged cross-sectional view taken in a plane that contains the axis of rotation of the tire of a portion of the crown region of a tire according to the present invention. The tread 50 of a tire according to the invention has a base portion 51 with a plurality of traction elements 52 extending radially outwardly from the base portion of the tread. Preferably, the tread comprises an elastomeric material, or materials, having a modulus of elasticity in the range of 2 to 20 Meganewtons per meter$^2$ at 300% elongation per ASTM Standard D412. If the modulus of elasticity of the tread material is too high the material will not deform enough in the tire footprint to render the full benefits of the invention, and conversely, if the tread material has too low of a modulus, the traction elements may scrub excessively against the ground and wear rapidly. Each traction element 52 has a ground-engaging surface 53 which communicates with the base portion of the tread by means of a plurality of walls 54 which are preferably disposed substantially perpendicular to the axis of rotation of the tire. As used herein and in the claims, substantially perpendicular means within 15° of being exactly perpendicular. Of course the walls may also serve as the walls of grooves which serve as paths for the evacuation of water from the footprint of the tire.

The traction elements 52 are preferably disposed such that every possible radial cross-section of the tire intersects a plurality of traction elements which have ground-engaging surfaces 53 which are convex. That is to say, a plurality of said ground-engaging surfaces have a form such that the locus of the points on these ground-engaging surfaces of the traction elements traveling laterally across them at any location along their circumferential length follows a path and defines a line which is continuously convex and has its center of curvature disposed radially inwardly of the convex line. As used herein and in the claims "locus" is understood to mean the set of all points whose location is determined by stated conditions. The locus of the points on the ground-engaging surfaces can be determined using a dial-indicator or other suitable gauge at various locations laterally across the ground-engaging surface. As used herein and in the claims, "lateral" and "laterally" refer to directions perpendicular to the mid-circumferential centerplane of a tire. Preferably, when a tire according to the invention is mounted on a rim having the design rim width for that tire and is subjected to a load while the tire is inflated to the specified inflation pressure for said load, the tread has a tread arc of a radius such that the tread arc is not coincident with the ground engaging surfaces of the traction elements. As used herein and in the claims the design rim width for a tire and its specified inflation pressure for a given load are those recommended by the manufacturer of a tire, or if not available from the manufacturer, those specified by an organization setting industrial standards for tires and rims in the locality where the tire was manufactured. Examples of such organizations are The Tire & Rim Association, Inc. in the United States of America, and The European Tyre and Rim Technical Organization in Europe. A "tread arc" is the overall curvature of the tread in a lateral direction. It is possible to practice the present invention without modifying the ground-engaging surface of every traction element of a tire tread. The particular arrangement and geometric shape of the traction elements may be selected by a tire engineer in accordance with the use intended for that tire.

It is preferred that a tire according to the invention have a radial ply carcass with a tread-reinforcing member, commonly referred to in the art as a belt structure 55, 56, interposed between the radial ply carcass and the base portion of the tread. The belt structure is an important component of any tire (either bias ply or radial ply) according to the invention because one of the purposes of any belt ply is to hold the tread firmly against the road.

Figure 6:
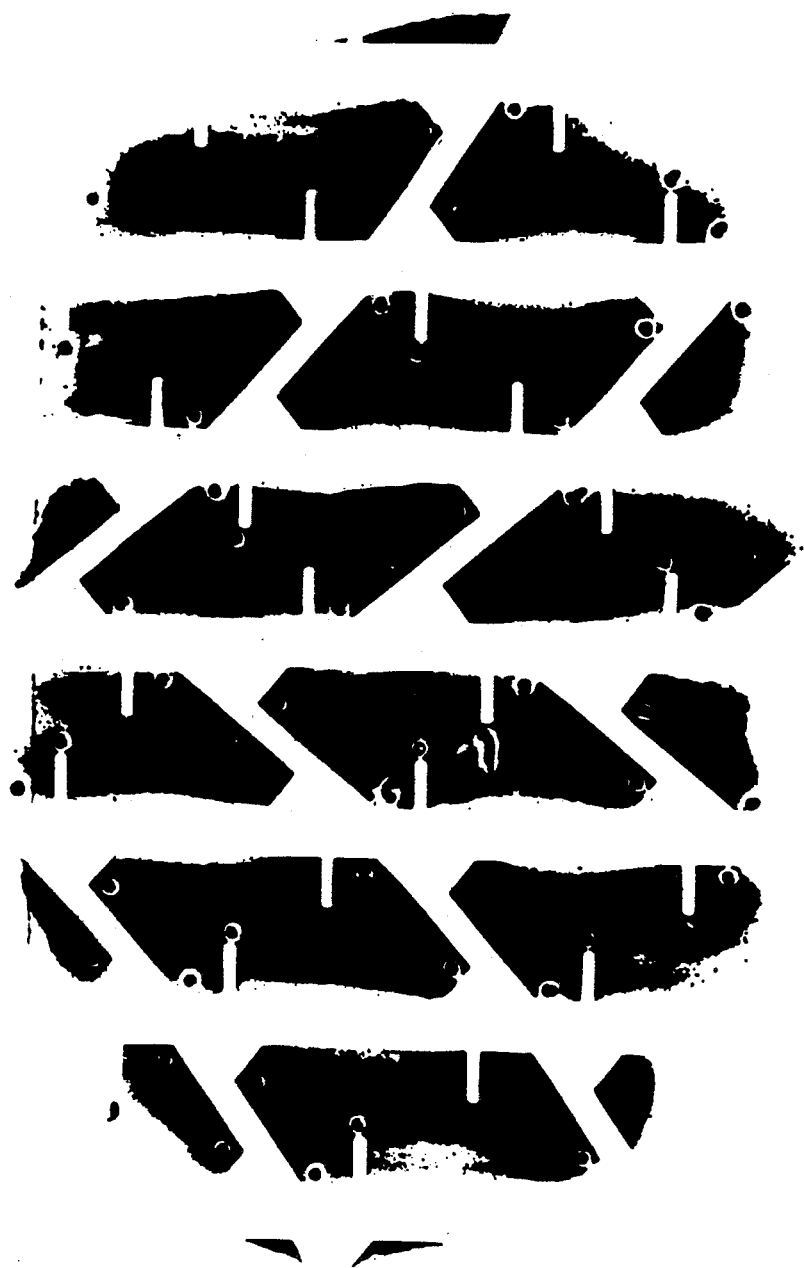

Referring again to FIG. 4, the intermittent dashed line B represents the contact pressure across the axial width of the ground-engaging surface of a traction element wherein said ground-engaging surface follows, in a transverse direction, a path which is continuously convex. When compared to the pressure distribution A for the ground-engaging surface of traction element of a prior art tire it can be seen that the contact pressure is higher at the center of the ground-engaging surface than at its edges. This means that the convex ground-engaging surfaces of a tire according to the invention should not trap water between their edges. Referring to FIG. 6 there is shown a footprint of a tire according to the invention. The new tire is of the same size, and mounted on the same size rim, inflated to the same pressure, and subjected to the same load as the prior art tire whose footprint is shown in FIG. 5. That is to say, the new tire was also mounted on a rim having the design rim width for said tire, and subjected to a load while inflated to the specified inflation pressure for said load. The tread pattern for the new tire in this example is slightly different than that of the prior art tire of FIG. 5, but in other respects the structures of the tires was substantially the same. In the footprint of the new tire there is good contact between the ground-engaging surfaces of the tire and the supporting surface at the center of the ground-engaging surfaces, and areas of lesser contact at the edges of some of the ground-engaging surfaces. This footprint reinforces the theory that water will not be trapped between the edges of a ground-engaging surface of a traction element according to the invention and thereby attains better contact of the tire with the ground.

The variation between the convex paths or lines defined by the locus of the points on the ground-engaging surfaces of traction elements across the width of the tread is needed because the unit tread pressure varies across the width of the tread, as illustrated in FIGS. 7 and 8. The amplitude of the convex path or line defined by the ground-engaging surface of each traction element varies between traction elements across the axial width of the tread with respect to the variation in unit tread pressure across the axial width of a footprint of the tire when the tire is mounted on a rim having the design rim width for said tire, and subjected to a load while inflated to the specified inflation pressure for said load such that the amplitude of the convex line is greater for a ground-engaging surface located in a region of relatively high unit pressure and lesser for a ground-engaging surface located in a region of relatively low unit pressure. That is to say, a tire according to the invention will still have variations in unit tread pressure at various locations in its ground-contact patch and the amplitude of the crowned ground-engaging surfaces will vary in a direct relationship to the variation in unit tread pressure across the axial width of the tread portion of the tire. Referring to FIG. 9, as used herein and in the claims the amplitude a of the convex path is the greatest distance of any point on the ground-engaging surface 53 from a baseline b extending between the radially outer edges of the axially opposing walls 34 of the traction element whose ground-engaging surface is being measured. It is not necessary that the convex line defined by the locus of the points be an arc of a circle, or even that the greatest amplitude of the convex line be at the axial center of the ground-engaging surface.

Figure 10:
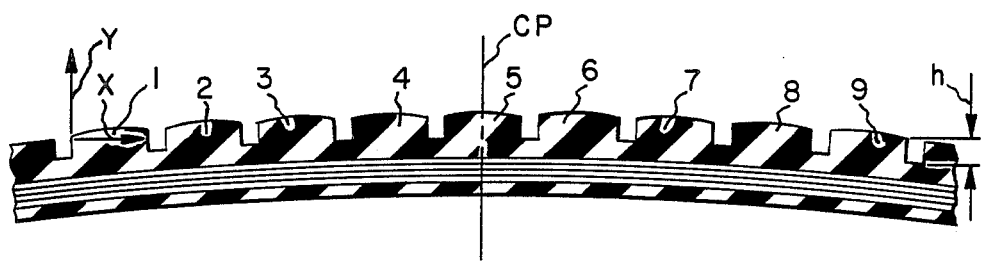
FIG. 10 is a fragmentary cross-sectional view taken in a plane that contains the axis of rotation of the tire of a tire according to the invention.

There is illustrated for example in FIG. 10 a diagrammatic representation of a cross-sectional view taken in a plane that contains the axis of rotation of the tire of the crown region of a size 455/50-13 tire that was manufactured according to the invention. In this example, the ground-engaging surfaces of the traction elements each follow a continuously convex path according to the general equation $$y = Ax^2 + Bx + C$$

The coordinate system for x and y is illustrated on traction element no. 1 of FIG. 10. The values of A, B and C for each of the lugs is set forth below.

| Traction Element No. | A | B | C |
| --- | --- | --- | --- |
| 1 | −.1230 | .1239 | .0005 |
| 2 | −.1243 | .1252 | .0006 |
| 3 | −.1268 | .1277 | .0006 |
| 4 | −.1295 | .1303 | .0006 |
| 5 | −.1321 | .1330 | .0006 |
| 6 | −.1295 | .1303 | .0006 |
| 7 | −.1268 | .1277 | .0006 |
| 8 | −.1243 | .1252 | .0006 |
| 9 | −.1230 | .1239 | .0005 |

The axial width of the ground-engaging surface of each of the traction elements 1–9 was 2.54 cm (1 inch), and the greatest amplitude y for each of the traction elements was:

| Traction Element No. | Greatest Amplitude of Convex Path | |
| --- | --- | --- |
| | (in inches) | (in mm) |
| 1 | .0317 | .805 |
| 2 | .0320 | .813 |
| 3 | .0328 | .833 |
| 4 | .0333 | .846 |
| 5 | .0341 | .866 |
| 6 | .0333 | .846 |
| 7 | .0328 | .833 |
| 8 | .0320 | .813 |
| 9 | .0317 | .805 |

In can be seen from this example that the variation in amplitude of the convex lines defined by the ground-engaging surfaces need not be very large, in fact, the range is only on the order of 0.06 mm (0.002 in). In the example illustrated in FIG. 10 the radial height h of the walls connecting the ground-engaging surfaces to the base portion of the tread is about 6.4 mm (¼ in) so that the convex path has a maximum amplitude of about 0.1% of the radial height h that a prior art traction element would have. In this example, the centermost traction element 5 has the greatest degree of convexity and the convexity decreases as a function of each traction element's distance from the mid-circumferential plane CP of the tire. The tire of this example has its greatest unit tread pressure in the center of the tire, so that the amplitude of the ground-engaging surfaces of the traction elements decreases as the unit tread pressure decreases.

Of course, if the unit tread pressure for a tire is greater at the lateral edges of the tire's footprint than at the the center of the footprint, the amplitude of the convex lines defined by the ground-engaging surfaces of the traction elements should increase as the distance of the traction elements from the mid-circumferential plane of the tire increases. The amplitude of the convex lines defined by the ground-engaging surfaces should be optimized by the tire designer and is dependent upon the carcass ply and belt structure of the tire as well as the geometric shape of the traction elements and the material which comprises the tread of the tire.

Referring once again to FIGS. 7 and 8 which show the unit tread pressure distribution in the footprint of a radial tire, it is evident that the contact pressure on any given point on a ground-engaging surface of the tread will vary as that point passes through a footprint of the tire.

Figure 11:
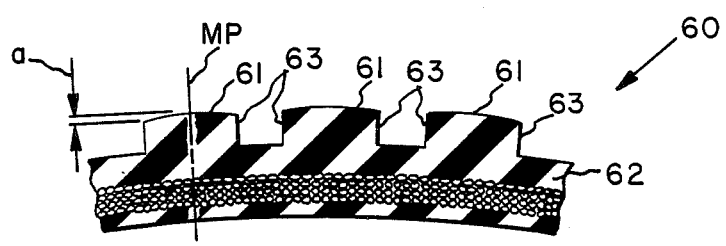
FIG. 11 is a partial cross-sectional view of a tire along a plane perpendicular to the axis of rotation of a tire according to another aspect of the invention.

FIG. 11 shows a partial cross-section of a tire 60 taken perpendicular to the axis of rotation of the tire, wherein the cross-section intersects the ground-engaging surface 61 of at least one traction element, said ground-engaging surfaces communicating with the base portion 62 of the tread by means of a plurality of walls 63 which are preferably disposed substantially perpendicular to the axis of rotation of the tire. The locus of the points on said ground-engaging surfaces of the traction elements traveling in a circumferential direction at any location across the axial width to the ground-engaging surface follows a path and defines a line which is continuously convex, said line not being coincident with any circle that has its center located on the axis of rotation of the tire. The greatest amplitude of the convex line is located at a point other than the mid-point MP of the circumferential length of the traction element. Put another way, the greatest amplitude of the convex line defined by the ground-engaging surface of a traction element in a circumferential direction is located either: (a) between the mid-point of the circumferential length of a traction element and a leading edge of the ground-engaging surface; or (b) between the mid-point and a trailing edge of the ground-engaging surface. If desired in a particular embodiment, the amplitude of the convex line defined by the locus of the points on the ground-engaging surface of at least one of the traction elements intersected by said cross-section is different from the amplitude of the convex line defined by the locus of the points followed by the ground-engaging surface of at least one of the other traction elements intersected by the cross-section, traveling in a circumferential direction. The location of the greatest amplitude of the convex lines may also vary between ground-engaging surfaces.

As used herein, a "leading edge" of a traction element is the first edge of the ground-engaging surface to enter the footprint of a rotating tire and the "trailing edge" is the last edge of the ground-engaging surface to enter the footprint of a rotating tire. The "mid-point of the circumferential length" of a traction element is located midway between the leading and trailing edges of a traction element on a plane that includes the axis of rotation of the tire.

It is believed that a tire according to this aspect of the invention will have a more uniform unit tread pressure especially if the tire is a directional type of tire. A directional tire has a tread pattern that is designed to operate differently when the tire is rotated in opposite directions.

While it is preferred that in a tire according to the present invention the ground-engaging surface of every traction element is continuously convex in both the lateral and circumferential directions, as disclosed herein, it is possible to have a tire with traction elements with ground-engaging surfaces that are convex only in an axial direction, or only in a circumferential direction, or a mixture of traction elements of the three types on a single tire.

While certain representative embodiments have been described herein for the purpose of illustrating the invention, it is understood that persons of skill in the tire art can make various modifications to these illustrative embodiments without deviating from the scope of the invention.

We claim:

1. A tire comprising a tread having a base portion and a plurality of traction elements extending radially outwardly from said base portion, said traction elements each having a ground-engaging surface which communicates with said base portion by means of a plurality of walls, a plurality of said ground-engaging surfaces having a form such that the locus of the points on any of these plurality of ground-engaging surfaces traveling laterally across them at any location along their circumferential lengths defines a line which is continuously convex and has its center of curvature disposed radially inwardly of said convex line, said tread having a tread arc of a radius such that the tread arc is not coincident with said convex ground-engaging surfaces, the amplitudes of the convex lines defined by the locus of the points on said plurality of ground-engaging, surfaces varies across the axial width of the tread such variation being in relation to a variation in unit tread pressure across the axial width of a footprint of the tire when the tire is mounted on a rim having the design rim width for said tire, and subjected to a load while the tire is inflated to its specified inflation pressure for said load, such that the amplitude of a convex line is greater for a ground-engaging surface located in a region of relatively high unit pressure and lesser for a ground-engaging surface located in a region of relatively low unit pressure.

2. A tire according to claim 1 wherein the tire further comprises a radial ply carcass and a tread-reinforcing member interposed between the radial ply carcass and the base portion of said tread.

3. A tire according to either of claims 1 or 2 wherein a plurality of said ground-engaging surfaces have a form such that the locus of the points on these ground-engaging surfaces traveling in a circumferential direction at any location across the axial width of these ground-engaging surfaces defines a line which is continuously convex and has its center of curvature disposed radially inwardly of said convex line, said convex line not being coincident with any circle that has its center located on the axis of rotation of the tire, and the greatest amplitude of said convex line being located at a point other than the mid-point of the circumferential length of said ground-engaging surface.

4. A tire comprising a tread having a base portion and a plurality of traction elements extending radially outwardly from said base portion, said traction elements each having a ground-engaging surface which communicates with said base portion by means of a plurality of walls, a plurality of said ground-engaging surfaces having a form such that the locus of the points on these ground-engaging surfaces traveling in a circumferential direction at any location across the axial width of these ground-engaging surfaces defines a line which is continuously convex and has its center of curvature disposed radially inwardly of said convex line, said convex line not being coincident with any circle that has its center located on the axis of rotation of the tire, and the greatest amplitude of said convex line being located at a point other than the mid-point of the circumferential length of said ground-engaging surface.

5. A tire according to claim 4 wherein the greatest amplitude of said convex line is located between the mid-point of the circumferential length of said ground-engaging surface and a leading edge of the ground-engaging surface.

6. A tire according to claim 4 wherein the greatest amplitude of said convex line is located between the mid-point of the circumferential length of said ground-engaging surface and a trailing edge of the ground-engaging surface.

7. A tire according to any one of claims 4, 5 or 6 wherein the distance between the mid-point of the circumferential length of the ground-engaging surfaces to the greatest amplitude of said convex lines measured along said convex lines is not the same for each ground-engaging surface.

8. A tire according to any one of claims 4, 5 or 6 wherein the greatest amplitudes of said convex lines is not the same for each ground-engaging surface.

9. A tire according to claim 7 wherein the greatest amplitudes of said convex lines is not the same for each ground-engaging surface.

10. A tire according to claim 3 wherein the greatest amplitudes of said convex lines going in a circumferential direction is not the same for each said ground-engaging surface.

* * * * *